United States Patent
Letombe et al.

(10) Patent No.: US 12,045,158 B2
(45) Date of Patent: Jul. 23, 2024

(54) TEST CASE SELECTION AND ORDERING WITH COVERT MINIMUM SET COVER FOR FUNCTIONAL QUALIFICATION

(71) Applicant: Synopsys, Inc., Mountain View, CA (US)

(72) Inventors: Florian Letombe, Moirans (FR); Erwan P. D. Reguer, Saint Martin d'Heres (FR); Jean-Marc A. Forey, Grenoble (FR)

(73) Assignee: Synopsys, Inc., Sunnyvale, CA (US)

( * ) Notice: Subject to any disclaimer, the term of this patent is extended or adjusted under 35 U.S.C. 154(b) by 0 days.

(21) Appl. No.: 16/551,577

(22) Filed: Aug. 26, 2019

(65) Prior Publication Data
US 2020/0065234 A1 Feb. 27, 2020

(30) Foreign Application Priority Data
Aug. 27, 2018 (EP) .................................... 18190910

(51) Int. Cl.
*G06N 3/08* (2023.01)
*G06F 11/36* (2006.01)

(52) U.S. Cl.
CPC ...... *G06F 11/3676* (2013.01); *G06F 11/3664* (2013.01)

(58) Field of Classification Search
CPC ............. G06F 11/3676; G06F 11/3664; G06F 11/3688; G06F 11/3684; G06F 11/3692; G01R 31/31835
See application file for complete search history.

(56) References Cited

U.S. PATENT DOCUMENTS

| 7,574,681 | B2 | 8/2009 | Hampton | |
|---|---|---|---|---|
| 9,760,471 | B2* | 9/2017 | Pekelis | G06F 11/3688 |
| 2005/0081109 | A1* | 4/2005 | Czerwonka | G06F 11/263 714/38.14 |
| 2009/0282307 | A1* | 11/2009 | Chaturvedula | G01R 31/318314 714/E11.155 |
| 2015/0143179 | A1* | 5/2015 | Desai | G06F 11/3688 714/38.1 |
| 2017/0074932 | A1* | 3/2017 | Kourfali | G01R 31/31704 |

(Continued)

OTHER PUBLICATIONS

Badhera et al., "Fault based Test Suite Prioritization based on Minimal MUMCUT Strategy," International Journal of Computer Applications (0975-8887) vol. 89—No. 16, Mar. 2014.

(Continued)

*Primary Examiner* — S. Sough
*Assistant Examiner* — Mohammad H Kabir
(74) *Attorney, Agent, or Firm* — Park, Vaughan, Fleming & Dowler LLP; Laxman Sahasrabuddhe

(57) ABSTRACT

Techniques and systems for test case selection and ordering with covert minimum set cover for functional qualification are described. Some embodiments can determine a first set of test cases by, iteratively, identifying a set of faults that is covered by a smallest set of test cases, determining whether or not a test case that covers a fault is able to detect the fault, and selecting and adding a test case to the first set of test cases. Next, the embodiments can execute a minimum set cover process on the first set of test cases by using coverage scores for test cases in the first set of test cases for ranking.

20 Claims, 3 Drawing Sheets

(56) References Cited

U.S. PATENT DOCUMENTS

2018/0024192 A1\* 1/2018 Sinha ............... G01R 31/31703
714/738
2019/0220745 A1\* 7/2019 Huang ................... G06N 20/00
2019/0294536 A1\* 9/2019 Avisror ............... G06F 11/3688

OTHER PUBLICATIONS

Bertolino, "Using Spanning Sets for Coverage Testing," IEEE Transactions on Software Engineering, vol. 28, No. 11, Nov. 2003.

\* cited by examiner

TEST CASE SELECTION AND ORDERING WITH COVERT MINIMUM SET COVER FOR FUNCTIONAL QUALIFICATION

RELATED APPLICATION

This application claims priority, under 35 U.S.C. § 119(a), to European Provisional Patent Application No. 18190910.2, filed on 27 Aug. 2018, the contents of which are herein incorporated by reference in their entirety for all purposes.

COPYRIGHT NOTICE

The assignee of this patent document does not object to the facsimile reproduction of the patent document as it appears in the files of the United States Patent and Trademark Office, but otherwise reserves all rights whatsoever in any included works of authorship protected by copyright.

BACKGROUND

Technical Field

This disclosure relates to hardware and software testing. More specifically, this disclosure relates to test case selection and ordering with covert minimum set cover for functional qualification.

Related Art

In the process of hardware and software development, verification is a crucial step. Verification engineers develop tests to ensure that the design behaves as expected with no bugs. The increasing complexity of designs requires even more tests with longer runtimes, among which some become redundant. Since computation time and resources are limited, it can be necessary to select some of the most important tests (e.g., to reduce the amount of time required to run regression tests).

Additionally, component defects can be transient or permanent, and can be due to either component aging or to environmental perturbations. In automotive and avionics domains, and more generally in the context of safety related systems, component defects, if not handled, can lead to damages and accidents with injury or loss of life. Therefore, safety mechanisms are needed to identify, and correct unexpected behavior caused by defects.

Safety related applications are delivered with self-tests, i.e., the tests are embedded in the device and are executed periodically to ensure that the device is operating as expected. Because space and time constraints are typically very stringent in safety related applications, there is a vital need for selecting the most efficient tests at both the test bench level, and for embedded tests within a device.

One technique to determine test efficiency involves injecting artificial bugs or defects into the design to ensure that the test environment will detect them. U.S. Pat. No. 7,574,681, entitled "System for Evaluating Computer Program Tests by Means of Mutation Analysis" discloses how tests can be evaluated by using mutation analysis. In mutation analysis, errors or mutations are inserted into a non-mutated program, thereby producing a mutated program. Next, one or more tests are run on the mutated program to check whether or not the one or more tests detected the inserted mutations. For a given test case, we say that the test case does not detect a mutation if the non-mutated program and the mutated program produce identical results. On the other hand, we say that the test case detected the mutation if the non-mutated program and the mutated program produce different results. In this manner, mutation analysis can enable us to evaluate the quality of a test suite.

In Badhera, U. and Maheshwari A., "Fault based Test Suite Prioritization based on Minimal MUMCUT Strategy," International Journal of Computer Applications (0975-8887) Vol. 89—No 16, March 2014, the authors disclose a technique for prioritization of minimum MUMCUT test cases in order to improve regression testing. In Marre M., Bertolino A., "Using Spanning Sets for Coverage Testing," IEEE Transactions on Software Engineering, Vol. 28, No. 11, November 2003, the authors introduce the concept of a spanning set, which is a minimum subset of entities such that a test suite covering the entities in this subset is guaranteed to cover every entity in the entire set of entities that are required to be covered by a test suite.

As the complexity of designs increases, the number of artificial bugs/defects, and the size of test sets grow exponentially. The number of simulations necessary to sort and select the most efficient tests thus explodes with the complexity of the design, since each pair of bug and test case requires simulation.

SUMMARY

This section is not intended to limit the scope of the disclosed subject matter. The disclosed subject matter is to be accorded the widest scope consistent with the principles and features disclosed in the entire disclosure. Some embodiments described herein provide systems and techniques for test case selection and ordering with covert minimum set cover for functional qualification.

In some embodiments, all of the tests in a test suite are ranked in order to select a subset capable of detecting most of the bugs/defects in a reasonable amount of time. These embodiments can check if the covered faults (by activation) can also be detected, and can determine a minimal subset of test cases providing almost the same detection rate as the full test suite.

Some embodiments make use of the insight that if a test case can detect a buried fault, it should also detect all or most of the faults that the test case covers. A fault is considered to be buried when it is difficult to exercise. Typically, buried faults represent faults covered by a few tests. Some embodiments can run detection simulations only on poorly covered faults, which means that only a limited number of simulations is necessary. Moreover, these embodiments select tests for inclusion in the subset only for a good reason, i.e., the embodiments ensure that the test case detects at least one fault before selecting the test case to be in the subset of tests.

Some embodiments can iteratively perform a set of operations, comprising: (1) identifying a set of faults that is covered by a smallest set of test cases selected from a collection of test cases, wherein the set of faults is selected from a collection of faults; (2) until a termination condition is met, determining, for each fault in the set of faults, whether or not a test case that covers the fault is able to detect the fault; (3) selecting a first test case from the smallest set of test cases; (4) adding the first test case to a first set of test cases, and removing the first test case from the collection of test cases; and (5) removing faults covered by the first test case from the collection of faults. Next, the embodiments can execute a minimum set cover process on the first set of test cases by using coverage scores for test cases in the first set of test cases for ranking.

In some embodiments, the termination condition is met when a predetermined fraction of all fault and test case pairs have been processed. In some embodiments, the predetermined fraction is less than 0.1.

In some embodiments, said selecting the first test case from the smallest set of test cases comprises selecting the test case that detects a largest number of faults. In some embodiments, said selecting the first test case from the smallest set of test cases comprises selecting the test case that covers a largest number of faults.

In some embodiments, the set of operations is performed iteratively until no more test cases can be selected.

DETAILED DESCRIPTION

Figure 1:
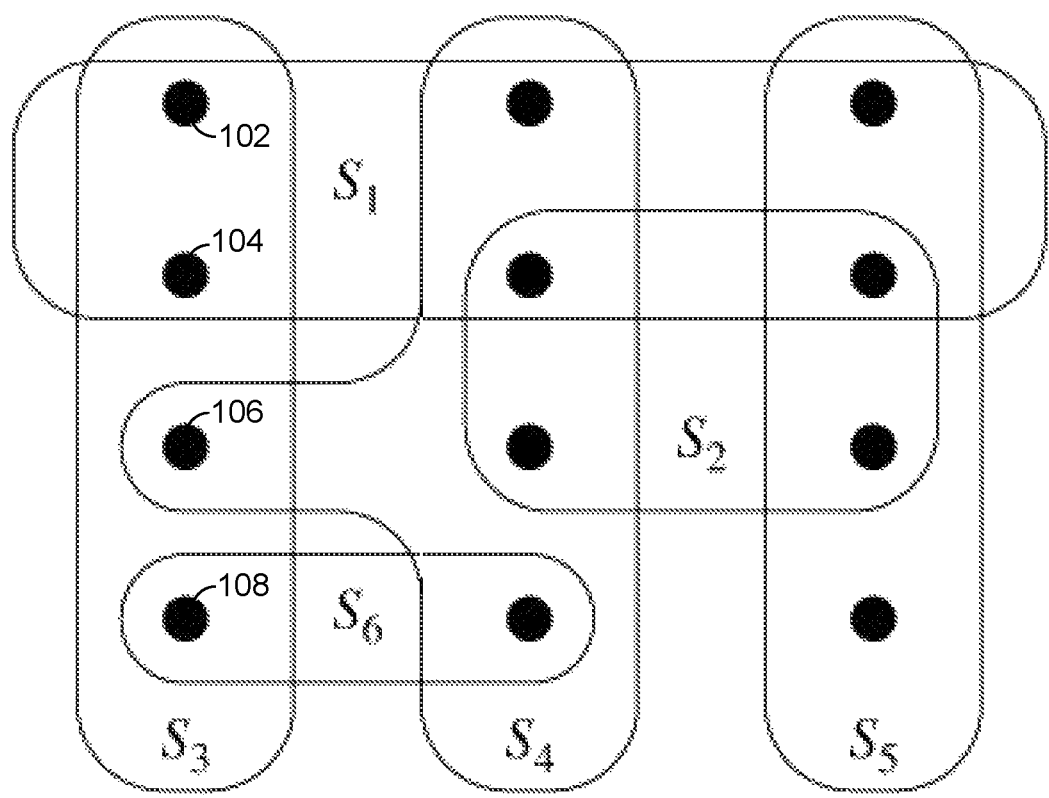
FIG. 1 illustrates the minimum set cover problem in the context of testing in accordance with some embodiments described herein.

The following description is presented to enable any person skilled in the art to make and use the claimed invention(s), and is provided in the context of particular application(s) and/or environment(s). Various modifications to the disclosed embodiments will be readily apparent to those skilled in the art, and the general principles defined herein may be applied to other embodiments and applications without departing from the spirit and scope of the disclosure. Thus, the disclosed subject matter is not limited to the embodiments shown, but is to be accorded the widest scope consistent with the principles and features disclosed herein.

In this disclosure, numerous specific details may be described to enable one or more of the embodiments. In the interest of not obscuring the presentation of the embodiments, some features that are known in the art may be combined together, may be described in less detail, or may be implied (i.e., some well-known features may not be explicitly described). Furthermore, while this description may refer to some features in the singular tense, more than one instance of the feature may be illustrated in the figures, and like components are labeled with like numerals.

Functional safety verification is one of the most critical issues for automobile development. Safety related automotive chips require compliance to ISO 26262 ASIL requirements, extending far beyond functional verification. New features in autonomous driving, advanced driver assistance, drivetrains, and active/passive safety systems rely on advanced SoCs, and complete, fully-documented safety verification of these components is critical for their acceptance into automotive systems.

Automotive safety verification must work in concert with functional verification, and requires new perspectives and approaches in order to be successful. Even if a feature has been implemented perfectly, and thoroughly verified to be in conformance with its functional specification, this is by no means sufficient for functional safety compliance because functional verification does not take faulty behavior caused by random defects that may occur during the lifecycle of the component into account. Functional safety verification explicitly models faulty behaviors caused by random defects, and verifies that the safety mechanisms built into safety related automotive SoCs properly manage these behaviors.

Verification test bench quality is commonly measured using coverage metrics, such as code coverage, toggle coverage, and functional coverage, which are enabled during simulation. These metrics reflect how well test vectors exercise a design, but they are insensitive to the test bench error detection capabilities.

Mutation-based techniques used by a functional qualification tool help improve the test bench by identifying flaws in the test bench. An example of one such tool is Certitude by Synopsys, Inc., which injects faults (or artificial bugs/defects) in a reference design under test, and then runs the simulations and measures observability of each injected fault by the test bench.

To be detected, a fault (1) needs to be covered, i.e., the code where the fault is injected must be exercised, and (2) needs to be observed, i.e., the fault must be propagated to an observable point and caught by the test bench.

Determining the subset of tests that have the exact same results as the full test bench can be achieved for coverage because it is not too costly to determine a subset that provides same coverage as the entire set of tests. Specifically, it is sufficient to run each test case once to determine the coverage results. Then a greedy minimum set cover algorithm can provide a good approximation of the test case subset solution.

However, to determine the fault detection for one test case, typically, only one fault can be injected at a time. Hence, one would have to run all fault/test case pairs to determine the population of test cases achieving exactly the same results as the full test bench for detection. However, this approach is unrealistic in practice because it would require an unrealistic amount of computational resources as there are typically millions of faults and thousands of test cases.

Additionally, in the context of safety related systems, the hardware safety requirements must comply with the "fault tolerant time interval" for safety mechanisms (ISO 26262-4:2011, 6.4.2.3). One way to comply with this requirement is by using embedded diagnostic self-tests. As mentioned earlier, embedding self-tests imposes severe constraints on the number of self-tests that can be executed, and also on the amount of time available to execute self-tests. Therefore, the difficult problem is to determine a subset of test cases while preserving the ability to detect faults. Embodiments described herein solve this difficult problem and determine a minimal subset of test cases, and rank the test cases, wherein the minimal subset of test cases retains the ability to detect faults. This solves the issue of the severe computational constraints that exist for embedded self-tests. The subset of test cases that is determined by embodiments disclosed herein are capable of identifying most of the faults (wherein each fault models a bug or defect that can be due to component perturbation or aging), and the subset of self-tests can be periodically executed by the safety related system or device to detect any incorrect behavior.

FIG. 1 illustrates the minimum set cover problem in the context of testing in accordance with some embodiments described herein. In FIG. 1, each filled circle corresponds to an object, and each enclosure (i.e., closed curve) corresponds to a test case that test the objects that are within the enclosure. For example, test case $S_3$ tests objects 102, 104, 106, and 108. An object can generally be anything that is desired to be tested. For example, an object can be an injected fault, a block of code, a signal, a variable, a specific combination of value assignments to variables, user-defined cover groups, etc.

The minimum set cover problem can be defined as follows. Given a set of elements (e.g., the 12 objects shown in FIG. 1), and a collection S of sets (i.e., test cases $S_1$ through $S_6$ shown in FIG. 1), the minimum set cover problem involves identifying the smallest sub-collection of S whose union covers the universe of elements. In the context of testing, each element maps to an object (e.g., injected fault) that is to be tested, and each set maps to a test case that tests one or more objects.

For example, if we solve the minimum set cover problem for FIG. 1, we find that tests $S_3$, $S_4$, and $S_5$ are sufficient to provide test coverage for all of the 12 objects. The minimum set cover problem is a well-known NP-complete problem. Therefore, no polynomial-time method exists that can always determine the minimum set cover. However, existing greedy algorithms can provide a good approximation of the optimal solution when the population of elements (i.e., the universe of objects) and the nature of sets are known.

Recall that, just because a test case is intended to test an object, it doesn't mean that the test case will be able to detect all injected faults in the object. Specifically, even though two tests cover the same object, one test case may be much better at detecting injected faults in the object than the other test case. To take a concrete example, consider test cases $S_3$ and $S_6$ in FIG. 1. Both of these test cases cover object 108. However, when a specific fault is injected into object 108, it is possible that test case $S_6$ is able to detect the fault, whereas test case $S_3$ fails to detect the fault. Recall that when we computed the minimum set cover, we determined that test cases $S_3$, $S_4$, and $S_5$ cover all of the objects. Unfortunately, the minimum set cover did not include test case $S_6$ which, in our example, is much better than test case $S_3$ in detecting injected faults in object 108. Therefore, if we simply rely on test coverage as our guide to determine the minimum set cover, then we may end up with a subset of test cases that is not effective at detecting faults in the objects. As mentioned earlier, in safety related applications, if a self-test suite is unable to detect certain faults, it can lead to terrible consequences.

Even though coverage is not enough to determine the efficiency of a test case to detect a fault, it is still a good indicator. Specifically, if a fault is not covered by a test case, then obviously the test case cannot detect the fault either. Note that, each test case only needs one execution to determine which faults it covers. An important insight that is used by embodiments described herein is as follows: a test case that is able to detect the least covered faults of the design is likely to also detect most of the faults that it is covering.

One embodiment determines the subset of test cases as follows:
1. Initialize $T^{all}$ to be the set of all test cases set, initialize the subset of test cases to be the empty set, i.e., $T^a$=NULL SET, and initialize U be the set of all faults.
2. Find the least covered faults that are covered by n test cases. Let this set of faults be F.
3. Run simulations for each fault/test case pair for each fault in the set F, and
   a. Stop as soon as more than X % of the total number of fault/test case pairs is reached (in some embodiments, X<10, and in particular, X=3 provided good results based on some experimental results), or
   b. Stop as soon as a test case $t_i$ detects a fault if n is 1, or
   c. Select test case $t_i$ that detect the most number of faults in F, and if there are multiple test cases that detect the same number of faults, then break the tie by selecting the test case that covers the most faults in U.
4. Add $t_i$ to $T^a$, and remove $t_i$ from $T^{all}$.
5. Remove faults covered by $t_i$ from U.
6. Return back to step 2, keep performing the loop until no test case can be selected.
7. Run a greedy minimum set cover process by using the coverage scores on $T^a$ for ranking.

Figure 2:
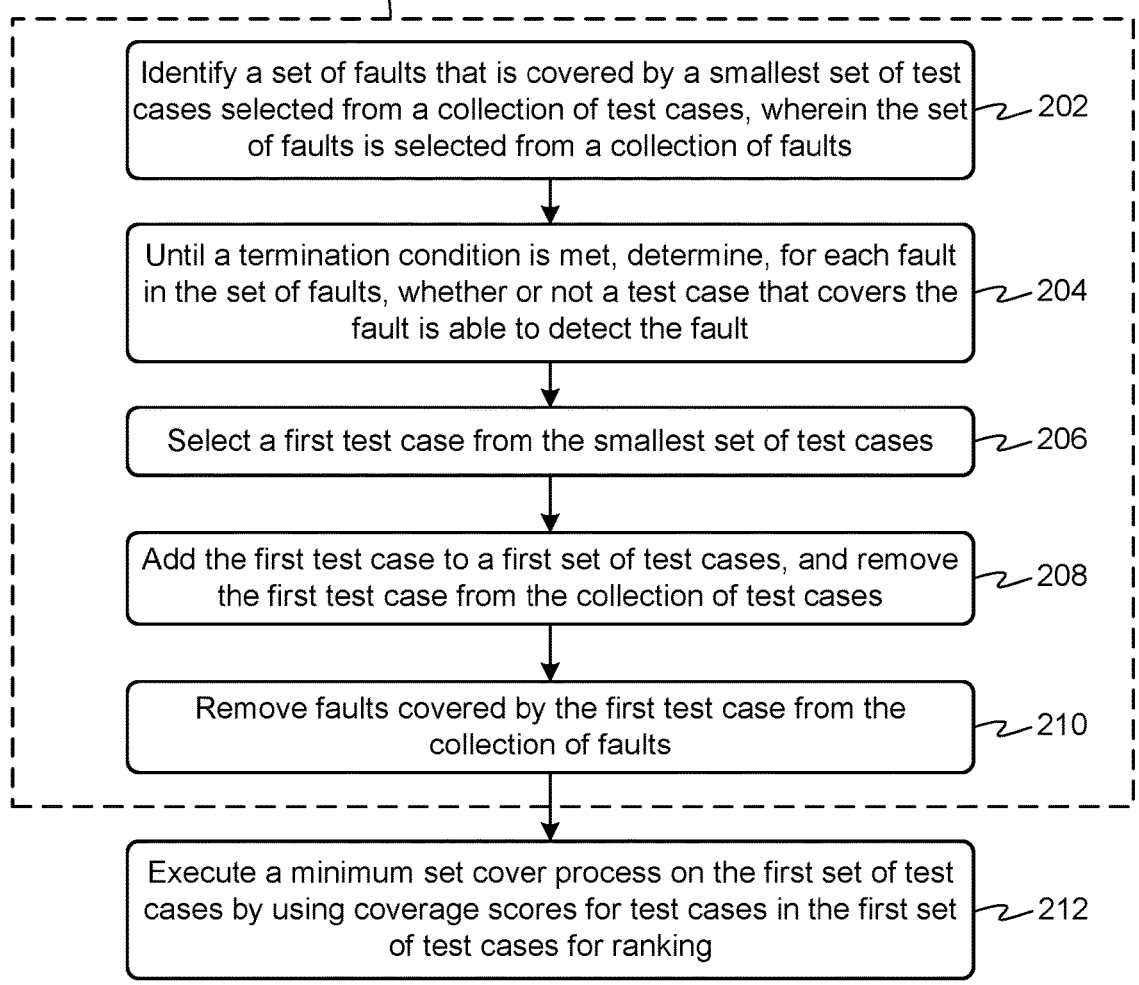
FIG. 2 illustrates a process for test case selection and ordering with covert minimum set cover for functional qualification in accordance with some embodiments described herein.

FIG. 2 illustrates a process for test case selection and ordering with covert minimum set cover for functional qualification in accordance with some embodiments described herein. The process can comprise a set of operations 200 that are iteratively performed until no more tests can be selected. Specifically, each iteration can begin by identifying a set of faults that is covered by a smallest set of test cases selected from a collection of test cases, i.e., $T^{all}$, wherein the set of faults is selected from a collection of faults, i.e., U (operation 202). Next, until a termination condition is met, the process can determine, for each fault in the set of faults, whether or not a test case that covers the fault is able to detect the fault (operation 204). In some embodiments, the termination condition is met when a predetermined fraction of all fault and test case pairs have been processed. In some embodiments, the predetermined fraction is less than 0.1 (e.g., the predetermined fraction can be 0.03).

The process can then select a first test case (i.e., test case $t_i$) from the smallest set of test cases (operation 206). In some embodiments, selecting the first test case from the smallest set of test cases comprises selecting the test case that detects a largest number of faults. If there is a tie, then in some embodiments, the test case that covers a largest number of faults can be selected from the test cases that were tied.

Next, the process can add the first test case to a first set of test cases (i.e., $T^a$), and remove the first test case from the collection of test cases (operation 208). The process can then remove faults covered by the first test case from the collection of faults (operation 210).

Once the iterative set of operations 200 has completed, the process can execute a minimum set cover process on the first set of test cases by using coverage scores for test cases in the first set of test cases for ranking (operation 212). In some embodiments, the minimum set cover process can be a greedy minimum set cover process.

To reiterate, an important insight is that if a test case can detect a buried fault, it is likely to also detect all or most of the faults that it was intended to cover. According to one definition, a fault is considered to be buried if it is difficult to exercise. Typically, buried faults are covered by few test cases. Embodiments described herein provide a good ranking of selected test cases since the most covering test cases are ranked high by the greedy minimum set cover algorithm. There are two main benefits in running detection simulations only on poorly covered faults: (1) a limited number of simulations is required, and (2) a test case is selected only for a good reason, i.e., the test case is selected only when it can detect at least one fault.

In safety related designs, there are millions of faults to be qualified with thousands of test cases. Embodiments disclosed herein are able to reduce and rank test cases while preserving the detection score, which allows us to: (1)

reduce the regression and/or detection time with similar results, and (2) fulfill ISO 26262 requirement for safety mechanisms.

Embodiments described herein have advantages with respect to other techniques. These advantages include: (1) limited redundancy in coverage and detection for selected test cases, (2) tight simulation cost and solution size, and (3) detection results preservation (about 97%).

One technique is called CMetC (Coverage Minimum set Cover Metric Corrected). This technique involves refining results of the coverage score with some sampling based techniques. The technique operates in two steps: (1) run a minimum set cover greedy algorithm by only relying on the coverage score, and (2) refine results by selecting the most detecting test cases based on sampling of faults not covered as yet. This approach, albeit the refinement step allows to add relevant test cases, suffers from the first step drawbacks: a test case can be ranked high because it is the most covering one but is unable to detect any fault because of bad stimuli or missing checkers.

Another technique involves only on running random detection simulations, and selecting test cases that detected faults. This approach is computationally expensive because it requires too many simulations and it does not preserve global detection results. For the purposes of the discussion below, this technique will be referred to as DSMC (Detection Sampling Min Cover).

Finally, a third technique (which may not be realistic but is considered here for comparison purposes) is called the Full technique. In this technique, all fault/test-case pairs simulations are run, and then a minimum set cover greedy heuristic is used to determine a good approximation of the minimum set cover.

The above-described approaches were used to determine subset of tests for eight real examples that were selected for their diversity and their relatively high number of test cases. The examples included the following: (1) HC11, written in VHDL, 2458 faults, and 83 test cases, (2) Can, Verilog, 4522 faults, 12 test cases, (3) Ethernet, Verilog, 7002 faults, 63 test cases, (4) FPU, Verilog, 1884 faults, 124 test cases, (5) Bison, C, 17954 faults, 335 test cases, (6) Gawk, C, 23975 faults, 207 test cases, (7) Protobuf, C++, 25724 faults, 986 test cases, and (8) Ethernet, Netlist, 261566 faults, 33 test cases. Note that the netlist version of the Ethernet example has been obtained from the Verilog version using the Synopsys Design Compiler tool (DC).

Next, experiments were run with the following 4 approaches: (1) Full, (2) DSMC, (3) CMetC, and (4) the process illustrated in FIG. 2. Experimental results show that the process illustrated in FIG. 2, on the set of selected and representative examples, could reach a test case reduction rate of about 73%, where other approaches barely reached 65% of reduction, with comparable detection rates of about 99.6% with respect to the full test bench. Experiments also demonstrated the simulation cost efficiency of the process illustrated in FIG. 2. The process illustrated in FIG. 2 only needs 0.28% of simulations and 0.32% of total simulation time with respect to a full fault/test case pairs naïve approach, where the sampling based solution needs twice as much simulations as the process illustrated in FIG. 2.

Figure 3:
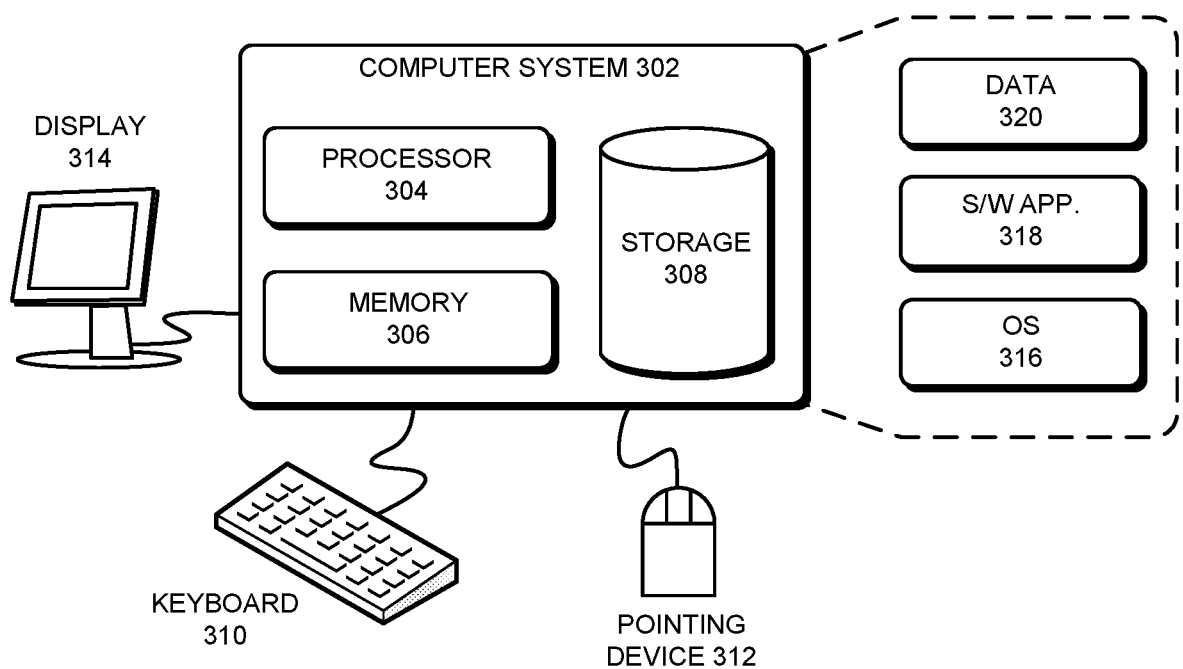
FIG. 3 illustrates a computer system in accordance with some embodiments described herein.

FIG. 3 illustrates a computer system in accordance with some embodiments described herein. The term "computer" or "computer system" generally refers to a hardware-based system that can perform computations required for the design and manufacture of ICs. Computer system 302 can include processor 304, memory 306, and storage device 308. Computer system 302 may include multiple processors, and processor 304 may include multiple cores. Specifically, memory locations in memory 306 can be addressable by processor 304, thereby enabling processor 304 to access (e.g., via load/store instructions) and manipulate (e.g., via logical/floating point/arithmetic instructions) the data stored in memory 306. Computer system 302 can be coupled to display device 314, keyboard 310, and pointing device 312. Storage device 308 can store operating system 316, software application 318, and data 320. Data 320 can include input required by software application 318 and/or output generated by software application 318.

Computer system 302 may automatically (or with user help) perform one or more operations that are implicitly or explicitly described in this disclosure. Specifically, computer system 302 can load software application 318 into memory 306, and software application 318 can then be used to determine a subset of tests using the above-mentioned processes. The resulting software code, IC chip, or device is more reliable because of the subset of tests that was selected using the disclosed processes.

While 'data' and 'information' often are used interchangeably (e.g., 'data processing' and 'information processing'), the term 'datum' (plural 'data') typically signifies a representation of the value of a measurement of a physical quantity (e.g., the current in a wire), or the answer to a question (e.g., "yes" or "no"), while the term 'information' typically signifies a structured set of data (often times signified by 'data structure'). A specified data structure is used to structure an electronic device to be used as a specific machine as an article of manufacture (see In re Lowry, 32 F.3d 1579 [CAFC, 1994]). Data and information are physical, for example binary data (a 'bit', usually signified with '0' and '1') enabled with two different levels of voltage in a circuit. For example, data can be enabled as an electrical, magnetic, optical or acoustical signal; a quantum state such as spin that enables a 'qubit'; or a physical state of an atom or molecule. All such data and information, when enabled, are stored, accessed, transferred, combined, compared, or otherwise acted upon, actions that require energy.

As used herein, the term 'process' signifies an unnatural sequence of physical actions and/or transformations (both also referred to as 'operations' or 'steps') to produce at least one result. The actions and transformations are technical applications of one or more natural laws of science or unnatural laws of technology. The actions and transformations often change the physical state of a machine, of structures of data and information, or of a composition of matter. Two or more actions can occur at about the same time, or one action can occur before or after another action, if they produce the same result. A description of the physical actions and/or transformations that comprise a process are often signified with a set of gerund phrases (or their semantic equivalents) that are typically preceded with the signifier 'the steps of' (e.g., "a process comprising the steps of measuring, transforming, partitioning and then distributing . . . "). The signifiers 'algorithm', 'method', 'procedure', '(sub)routine', 'protocol', 'recipe', and 'technique' often are used interchangeably with 'process', and 35 U.S.C. 100 defines a "method" as one type of process that is, by statutory law, always patentable under 35 U.S.C. 101. Many forms of knowledge, learning, skills and styles are authored, structured, and enabled—objectively—as processes—e.g., knowledge and learning as functions in knowledge programming languages. As used herein, the term 'rule' signifies a process with at least one conditional test (signified, e.g., by 'IF test THEN process'). As used herein, the term 'thread' signifies a sequence of operations or instructions that comprise a subset of an entire process. A process can be partitioned into multiple threads that can be used at or about at the same time.

As used herein, the term 'component' (also signified by 'part', and typically signified by 'element' when described in a patent text or diagram) signifies a physical object that is used to enable a process in combination with other components. For example, electronic components are used in processes that affect the physical state of one or more ('ensemble') electromagnetic or quantum particles/waves (e.g., electrons, photons) or quasiparticles (e.g., electron holes, phonons, magnetic domains) and their associated fields or signals. Electronic components have at least two connection points to which are attached 'leads', typically a wire with one end attached to the component and the other end attached to another component, typically as part of a circuit with current flows. There are at least three types of electrical components: passive, active and electromechanical. Passive electronic components typically do not introduce energy into a circuit—such components include resistors, memristors, capacitors, magnetic inductors, crystals, Josephson junctions, transducers, sensors, antennas, waveguides, etc. Active electronic components require a source of energy and can inject energy into a circuit—such components include semiconductors (e.g., diodes, transistors, optoelectronic devices), vacuum tubes, batteries, power supplies, displays (e.g., LEDs, LCDs, lamps, CRTs, plasma displays). Electromechanical components affect current flow using mechanical forces and structures—such components include switches, relays, protection devices (e.g., fuses, circuit breakers), heat sinks, fans, cables, wires, terminals, connectors and printed circuit boards. As used herein, the term 'netlist' is a specification of the components comprising an electric circuit, and electrical connections between the components. The programming language for the SPICE circuit simulation program is often used to specify a netlist. In the context of circuit design, the term 'instance' signifies each time a component is specified in a netlist.

One of the most important components as goods in commerce is the integrated circuit, and its res of abstractions. As used herein, the term 'integrated circuit' signifies a set of connected electronic components on a small substrate (thus the use of the signifier 'chip') of semiconductor material, such as silicon or gallium arsenide, with components fabricated on one or more layers. Other signifiers for 'integrated circuit' include 'monolithic integrated circuit', 'IC', 'chip', 'microchip' and 'System on Chip' ('SoC'). Types of integrated circuits include gate/logic arrays, processors, memories, interface chips, power controllers, and operational amplifiers. The term 'cell' as used in electronic circuit design signifies a specification of one or more components, for example, a set of transistors that are connected to function as a logic gate. Cells are usually stored in a database, to be accessed by circuit designers and design processes.

As used herein, the term 'module' signifies a tangible structure for acting on data and information that typically is limited in size and/or complexity. For example, the term 'module' can signify one or more processes that transforms data and information, for example, processes comprising a computer program. The term 'module' also can signify one or more interconnected electronic components, such as digital logic devices. A process comprising a module, if specified in a programming language, such as System C or Verilog, also can be transformed into a specification for a structure of electronic components that transform data and information that produce the same result as the process. This last sentence follows from a modified Church-Turing thesis, which is simply expressed as "Whatever can be transformed by a (patentable) process and a processor, can be transformed by a (patentable) equivalent set of modules.", as opposed to the doublethink of deleting only one of the "(patentable)".

A module is permanently structured (e.g., circuits with unalterable connections), temporarily structured (e.g., circuits or processes that are alterable with sets of data), or a combination of the two forms of structuring. Permanently structured modules can be manufactured, for example, using Application Specific Integrated Circuits ('ASICs') such as Arithmetic Logic Units ('ALUs'), Programmable Logic Arrays ('PLAs'), or Read Only Memories ('ROMs'), all of which are typically structured during manufacturing. For example, a permanently structured module can comprise an integrated circuit. Temporarily structured modules can be manufactured, for example, using Field Programmable Gate Arrays (FPGAs—for example, sold by Xilink or Intel's Altera), Random Access Memories (RAMs) or microprocessors. For example, data and information is transformed using data as an address in RAM or ROM memory that stores output data and information. One can embed temporarily structured modules in permanently structured modules (for example, a FPGA embedded into an ASIC).

Modules that are temporarily structured can be structured during multiple time periods. For example, a processor comprising one or more modules has its modules first structured by a manufacturer at a factory and then further structured by a user when used in commerce. The processor can comprise a set of one or more modules during a first time period, and then comprise a different set of one or modules during a second time period. The decision to manufacture or implement a module in a permanently structured form, in a temporarily structured form, or in a combination of the two forms, depends on issues of commerce such as cost, time considerations, resource constraints, tariffs, maintenance needs, national intellectual property laws, and/or specific design goals. How a module is used is mostly independent of the physical form in which it is manufactured or enabled. This last sentence also follows from the modified Church-Turing thesis.

As used herein, the term 'processor' signifies a tangible data and information processing machine for use in commerce that physically transforms, transfers, and/or transmits data and information, using at least one process. A processor consists of one or more modules (e.g., a central processing unit, 'CPU'; an input/output ('I/O') controller, a memory controller, a network controller, and other modules). The term 'processor' can signify one or more processors, or one or more processors with multiple computational cores/CPUs, specialized processors (for example, graphics processors or signal processors), and their combinations. Where two or more processors interact, one or more of the processors can be remotely located. Where the term 'processor' is used in another context, such as a 'chemical processor', it will be signified and defined in that context.

The processor can comprise, for example, digital logic circuitry (for example, a binary logic gate), and/or analog circuitry (for example, an operational amplifier). The processor also can use optical signal processing, DNA transformations or quantum operations, microfluidic logic processing, or a combination of technologies, such as an optoelectronic processor. For data and information structured with binary data, any processor that can transform data and information using the AND, OR and NOT logical operations (and their derivatives, such as the NAND, NOR, and XOR operations) also can transform data and information using any function of Boolean logic. A processor such as an analog processor, such as an artificial neural network, also can transform data and information. No scientific evidence exists that any of these technological processors are processing, storing and retrieving data and information, using any process or structure equivalent to the bioelectric structures and processes of the human brain.

The one or more processors also can use a process in a 'cloud computing' environment, where time and resources of multiple remote computers are shared by multiple users or processors communicating with the computers. For example, a group of processors can use at least one process available at a distributed or remote system, these processors using a communications network (e.g., the Internet, or an Ethernet) and using one or more specified interfaces (e.g., an application program interface ('APP') that signifies functions and data structures to communicate with the remote process).

As used herein, the term 'computer' and 'computer system' (further defined below) includes at least one processor that, for example, performs operations on data and information such as (but not limited to) the AND, OR and NOT logical operations using electronic gates that can comprise transistors, with the addition of memory (for example, memory structured with flip-flops using the NOT-AND or NOT-OR operation). Such a processor is Turing-complete and computationally universal. A computer can comprise a simple structure, for example, comprising an I/O module, a CPU, and a memory that performs, for example, the process of inputting a signal, transforming the signal, and outputting the signal with no human intervention.

As used herein, the term 'programming language' signifies a structured grammar for specifying sets of operations and data for use by modules, processors and computers. Programming languages include assembler instructions, instruction-set-architecture instructions, machine instructions, machine dependent instructions, microcode, firmware instructions, state-setting data, or either source code or object code written in any combination of one or more higher level languages, for example, the C programming language and similar general programming languages (such as Fortran, Basic, Javascript, PHP, Python, C++), knowledge programming languages (such as Lisp, Smalltalk, Prolog, or CycL), electronic structure programming languages (such as VHDL, Verilog, SPICE or SystemC), text programming languages (such as SGML, HTML, or XML), or audiovisual programming languages (such as SVG, MathML, X3D/VRML, or MIDI), and any future equivalent programming languages. As used herein, the term 'source code' signifies a set of instructions and data specified in text form using a programming language. A large amount of source code for use in enabling any of the claimed inventions is available on the Internet, such as from a source code library such as Github.

As used herein, the term 'program' (also referred to as an 'application program') signifies one or more processes and data structures that structure a module, processor or computer to be used as a "specific machine" (see In re Alappat, 33 F3d 1526 [CAFC, 1991]). One use of a program is to structure one or more computers, for example, standalone, client or server computers, or one or more modules, or systems of one or more such computers or modules. As used herein, the term 'computer application' signifies a program that enables a specific use, for example, to enable text processing operations, or to encrypt a set of data. As used herein, the term 'firmware' signifies a type of program that typically structures a processor or a computer, where the firmware is smaller in size than a typical application program, and is typically not very accessible to or modifiable by the user of a computer. Computer programs and firmware are often specified using source code written in a programming language, such as C. Modules, circuits, processors, programs, and computers can be specified at multiple levels of abstraction, for example, using the SystemC programming language, and have value as products in commerce as taxable goods under the Uniform Commercial Code (see U.C.C. Article 2, Part 1).

A program is transferred into one or more memories of the computer or computer system from a data and information device or storage system. A computer system typically has a device for reading storage media that is used to transfer the program, and/or has an interface device that receives the program over a network. This process is discussed in the General Computer Explanation section.

The signifier 'commercial solution' signifies, solely for the following paragraph, an engineering domain-specific (and thus non-preemptive—see Bilski): electronic structure, a process for a specified machine, a manufacturable circuit (and their Church-Turing equivalents) or a composition of matter that applies science and/or technology in commerce to solve a technical problem.

The signifier 'abstract' (when used in a patent claim for any enabled embodiments disclosed herein for a new commercial solution that is a scientific use of one or more laws of nature {see Benson}, and that solves a problem of technology {see Diehr} used in commerce—or improves upon an existing commercial solution {see Diehr})—is precisely defined by the inventor(s) {see MPEP 2111.01 (9th edition, Rev. 08.2017)} as follows:

a) a new commercial solution is 'abstract' if it is not novel (e.g., it is so well known in equal prior art {see Alice} and/or the use of equivalent prior art solutions is long prevalent {see Bilski} in science, engineering or commerce), and thus unpatentable under 35 U.S.C. 102, for example, because it is 'difficult to understand' {see Merriam-Webster definition for 'abstract'} how the commercial solution differs from equivalent prior art solutions; or b) a new commercial solution is 'abstract' if it is obvious, that is, if the existing prior art includes at least one analogous prior art solution {see KSR}, or the existing prior art includes at least two prior art publications that can be combined {see Alice} by a skilled person {often referred to as a 'PHOSITA', see MPEP 2141-2144 (9th edition, Rev. 08.2017)} to be equivalent to the new commercial solution, and is thus unpatentable under 35 U.S.C. 103, for example, because it is 'difficult to understand' how the new commercial solution differs from a PHOSITA-combination/-application of the existing prior art; or c) a new commercial solution is 'abstract' if it is not disclosed with a description that enables its praxis, either because insufficient guidance exists in the description, or because only a generic implementation is described {see Mayo} with unspecified components, parameters or functionality, so that a PHOSITA is unable to instantiate an embodiment of the new solution for use in commerce, without, for example, requiring special programming {see Katz} (or, e.g., circuit design) to be performed by the PHOSITA, and is thus unpatentable under 35 U.S.C. 112, for example, because it is 'difficult to understand' how to use in commerce any embodiment of the new commercial solution.

The Detailed Description signifies in isolation the individual features, structures, functions, or characteristics described herein and any combination of two or more such features, structures, functions or characteristics, to the extent that such features, structures, functions or characteristics or combinations thereof are enabled by the Detailed Description as a whole in light of the knowledge and understanding of a skilled person, irrespective of whether such features, structures, functions or characteristics, or combinations thereof, solve any problems disclosed herein, and without limitation to the scope of the Claims of the patent. When an embodiment of a claimed invention comprises a particular feature, structure, function or characteristic, it is within the knowledge and understanding of a skilled person to use such feature, structure, function, or characteristic in connection with other embodiments whether or not explicitly described, for example, as a substitute for another feature, structure, function or characteristic.

In view of the Detailed Description, a skilled person will understand that many variations of the claimed inventions can be enabled, such as function and structure of elements, described herein while remaining in the domain of the claimed inventions. One or more elements of an embodiment can be substituted for one or more elements in another embodiment, as will be understood by a skilled person. Writings about embodiments signify their uses in commerce, thereby enabling other skilled people to similarly use in commerce.

This Detailed Description is fitly written to provide knowledge and understanding. It is neither exhaustive nor limiting of the precise structures described, but is to be accorded the widest scope consistent with the disclosed principles and features. A skilled person can enable many equivalent variations. Without limitation, any and all equivalents described, signified or Incorporated By Reference in this patent application are specifically Incorporated By Reference into the Detailed Description. In addition, any and all variations described, signified or Incorporated By Reference with respect to any one claimed invention and its embodiment also are included with all other claimed inventions and their embodiments. Any such variations include both currently known variations as well as future variations, for example any element used for enablement includes a future equivalent element that provides the same function, regardless of the structure of the future equivalent element.

It is intended that the domain of the set of claimed inventions and their embodiments be defined and judged by the following Claims and their equivalents. The Detailed Description includes the following Claims, with each Claim standing on its own as a separate claimed invention. The embodiments of the claimed inventions can have more structure and features than are explicitly specified in the Claims.

The foregoing embodiments have been presented for purposes of illustration and description. They are not intended to be exhaustive or to limit the scope of this disclosure to the forms disclosed. Accordingly, many modifications and variations will be apparent to practitioners skilled in the art. Additionally, the above disclosure is not intended to limit the disclosed subject matter. The scope of the claimed invention(s) is defined by the appended claims.

What is claimed is:

1. A non-transitory computer-readable storage medium storing instructions, which when executed by a processor, cause the processor to:
   receive a first set of faults and a first set of test cases, wherein each fault in the first set of faults is associated with a defect in a circuit design, and wherein each fault in the first set of faults is covered by one or more test cases in the first set of test cases;
   determine a least covered fault in the first set of faults, wherein a total number of test cases in the first set of test cases which covers the least covered fault is a lowest total number of test cases compared to respective total number of test cases covering each fault in the first set of faults;
   determine whether a first test case in the first set of test cases which covers the least covered fault detects the least covered fault when the least covered fault is injected into a simulation of the circuit design; and
   remove faults from the first set of faults which are covered by the first test case when the first test case detects the least covered fault.

2. The non-transitory computer-readable storage medium of claim 1, wherein faults are removed from the first set of faults iteratively, and wherein a termination condition is met when a predetermined fraction of all fault and test case pairs have been processed.

3. The non-transitory computer-readable storage medium of claim 2, wherein the predetermined fraction is less than 0.1.

4. The non-transitory computer-readable storage medium of claim 1, wherein the first test case covers a largest number of faults among test cases in the first set of test cases which cover the least covered fault.

5. The non-transitory computer-readable storage medium of claim 1, wherein the instructions, which when executed by the processor, cause the processor to remove the first test case from the first set of test cases.

6. The non-transitory computer-readable storage medium of claim 1, wherein faults in the first set of faults which are covered by the first test case are not removed when the first test case does not detect the least covered fault.

7. The non-transitory computer-readable storage medium of claim 1, wherein tests are removed from the first set of tests iteratively, and wherein a termination condition is met when the first set of tests is empty.

8. An apparatus, comprising:
   a processor; and
   a non-transitory computer-readable storage medium storing instructions, which when executed by the processor, cause the processor to:
   receive a first set of faults and a first set of test cases, wherein each fault in the first set of faults is associated with a defect in a circuit design, and wherein each fault in the first set of faults is covered by one or more test cases in the first set of test cases;
   determine a least covered fault in the first set of faults, wherein a total number of test cases in the first set of test cases which covers the least covered fault is a lowest total number of test cases compared to respective total number of test cases covering each fault in the first set of faults:
   determine whether a first test case in the first set of test cases which covers the least covered fault detects the least covered fault when the least covered fault is injected into a simulation of the circuit design; and
   remove faults from the first set of faults which are covered by the first test case when the first test case detects the least covered fault.

9. The apparatus of claim 8, wherein faults are removed from the first set of faults iteratively, and wherein a termination condition is met when a predetermined fraction of all fault and test case pairs have been processed.

10. The apparatus of claim 9, wherein the predetermined fraction is less than 0.1.

11. The apparatus of claim 8, wherein the first test case covers a largest number of faults among test cases in the first set of test cases which cover the least covered fault.

12. The apparatus of claim 8, wherein the instructions, which when executed by the processor, cause the processor to remove the first test case from the first set of test cases.

13. The apparatus of claim 8, wherein faults from the first set of faults which are covered by the first test case are not removed when the first test case does not detect the least covered fault.

14. The apparatus of claim 8, wherein tests are removed from the first set of tests iteratively, and wherein a termination condition is met when the first set of tests is empty.

15. A method for test case selection and ordering with covert minimum set cover for functional qualification, the method comprising:
   receiving a first set of faults and a first set of test cases, wherein each fault in the first set of faults is associated with a defect in a circuit design, and wherein each fault in the first set of faults is covered by one or more testcases in the first set of test cases;
   determining a least covered fault in the first set of faults, wherein a total number of test cases in the first set of test cases which covers the least covered fault is a lowest total number of test cases compared to respective total number of test cases covering each fault in the first set of faults:
   determining whether a first test case in the first set of test cases which covers the least covered fault detects the least covered fault when the least covered fault is injected into a simulation of the circuit design; and
   removing, by a processor, faults from the first set of faults which are covered by the first test case when the first test case detects the least covered fault, wherein faults from the first set of faults which are covered by the first testcase are not removed when the first test case does not detect the least covered fault.

16. The method of claim 15, wherein faults are removed from the first set of faults iteratively, and wherein a termination condition is met when a predetermined fraction of all fault and test case pairs have been processed.

17. The method of claim 16, wherein the predetermined fraction is less than 0.1.

18. The method of claim 15, wherein the first test case covers a largest number of faults among test cases in the first set of test cases which cover the least covered fault.

19. The method of claim 15, further comprising removing the first test case from the first set of test cases.

20. The method of claim 15, wherein tests are removed from the first set of tests iteratively, and wherein a termination condition is met when the first set of tests is empty.

* * * * *

UNITED STATES PATENT AND TRADEMARK OFFICE
CERTIFICATE OF CORRECTION

| | | |
|---|---|---|
| PATENT NO. | : 12,045,158 B2 | |
| APPLICATION NO. | : 16/551577 | |
| DATED | : July 23, 2024 | |
| INVENTOR(S) | : Florian Letombe et al. | |

It is certified that error appears in the above-identified patent and that said Letters Patent is hereby corrected as shown below:

In the Claims

In Claim 15 (at Column 15, in Line 21), please delete the word "testcases" and replace with the words --test cases--

Signed and Sealed this
Tenth Day of September, 2024

Katherine Kelly Vidal
*Director of the United States Patent and Trademark Office*